United States Patent [19]
Wang

[11] Patent Number: 5,565,065
[45] Date of Patent: Oct. 15, 1996

[54] DISTILLED WATER SUPPLY DEVICE

[76] Inventor: Chin-Tu Wang, No. 1, Alley 6, Lane 244, Hsin Shu Rd., Hsinchuang City, Taipei Hsien, Taiwan

[21] Appl. No.: 563,337

[22] Filed: Nov. 28, 1995

[51] Int. Cl.$^6$ .................. B01D 3/42; C02F 1/04
[52] U.S. Cl. .............. 202/176; 202/180; 202/181; 202/194; 202/196; 202/202; 202/266; 203/1; 203/10; 203/22; 203/100; 203/DIG. 22
[58] Field of Search ............... 202/176, 180, 202/160, 181, 185.4, 190, 192–194, 196, 266, 202; 203/1, 10, 27, 100, DIG. 22, DIG. 18, 22; 137/386, 391, 395, 403; 222/67; 62/3.64, 3.7; 392/325

[56] References Cited

U.S. PATENT DOCUMENTS

| | | | |
|---|---|---|---|
| 4,089,750 | 5/1978 | Kirschman et al. | 202/190 |
| 4,110,170 | 8/1978 | Kirschman et al. | 202/160 |
| 4,209,363 | 6/1980 | Ramer | 202/180 |
| 4,601,789 | 7/1986 | Bjorklund | 202/181 |
| 4,622,102 | 11/1986 | Diebel | 202/202 |
| 4,882,012 | 11/1989 | Wasserman | 202/176 |
| 4,888,097 | 12/1989 | Palmer et al. | 202/206 |
| 4,894,123 | 1/1990 | Helmich | 202/176 |
| 4,915,793 | 4/1990 | Chou | 203/10 |
| 5,281,309 | 1/1994 | Greene | 203/1 |
| 5,290,402 | 3/1994 | Tsai | 202/206 |
| 5,314,586 | 5/1994 | Chen | 203/22 |

FOREIGN PATENT DOCUMENTS 3007868  8/1984  Japan.

*Primary Examiner*—Virginia Manoharan
*Attorney, Agent, or Firm*—Bacon & Thomas

[57] ABSTRACT

A distilled water supply device including a stand, a condensing unit mounted on the stand and separated by a partition wall into an upper chamber, which receives water from an external water source, and a bottom chamber, which condenses steam into distilled water, a heating unit detachably mounted inside the stand below the condensing unit and controlled to heat water from the upper chamber into steam, permitting steam to be guided into the bottom chamber for condensing, a vertical guide pipe for guiding water from the upper chamber to the heating unit, a vertical steam pipe for guiding steam from the heating unit to the bottom chamber for condensing.

5 Claims, 6 Drawing Sheets

DISTILLED WATER SUPPLY DEVICE

BACKGROUND OF THE INVENTION

The present invention relates to a distilled water supply device which produces distilled water for drinking.

Regular drinking fountains include two types, one using water filter means to filter drinking water for drinking, the other using electric heater means to boil water and water condensing means to condense steam into distilled water for drinking. Japanese patent no. 3007868, which was filed on Aug. 12, 1984 by the present inventor, discloses a distilling apparatus for the production of distilled water. This distilling apparatus comprises a condensing chamber divided into an upper holding space for receiving water from a water source and a lower holding chamber for condensing steam into water, a heating chamber controlled to heat water from the upper holding space into steam and having a steam outlet connected to the lower holding space for guiding steam into the lower holding space for condensing, a hot water chamber, which receives condensed water from the lower holding space of the condensing chamber, and a cold water chamber, which receives distilled water from the hot water chamber and cools it down by an electronic cooler. This structure of distilling apparatus is functional, however it still has drawbacks. One drawback of this structure of distilling apparatus is that steam tends to be condensed at the top of the heating chamber, because the steam passage way has a section curved downwards which conflicts with the upward flowing nature of steam. Another drawback of this structure of distilling apparatus is its complicated structure. Because the distilling apparatus includes four separate chambers, it is difficult to dismantle the parts of the distilling apparatus during a maintenance work.

SUMMARY OF THE INVENTION

The present invention has been accomplished to provide a distilled water supply device which eliminates the aforesaid drawbacks. According to the present invention, the distilled water supply device comprises a stand, a condensing unit mounted on the stand and separated by a partition wall into an upper chamber, which receives water from an external water source, and a bottom chamber for condensing steam into distilled water, and a heating unit suspended from the stand below the condensing unit, the heating unit having a guide pipe connected to the upper chamber through a check valve to receive water from the upper chamber for heating into steam and a vertical steam pipe connected to the bottom chamber for guiding steam to the bottom chamber for condensing into distilled water. Because the bottom chamber is disposed right above the heating unit and the heating unit is connected to the upper chamber by the steam pipe, the vertical steam passage way permits steam to be efficiently guided from the heating unit to the bottom chamber for condensing into distilled water. The heating unit comprises a container and a top cover fixed to the guide pipe and the steam pipe. Because this distilled water supply device is simple in structure, and the heating unit can be taken out of the stand, the maintenance work of this distilled water supply device is easy.

DETAILED DESCRIPTION OF THE PREFERRED EMBODIMENT

Figure 1:
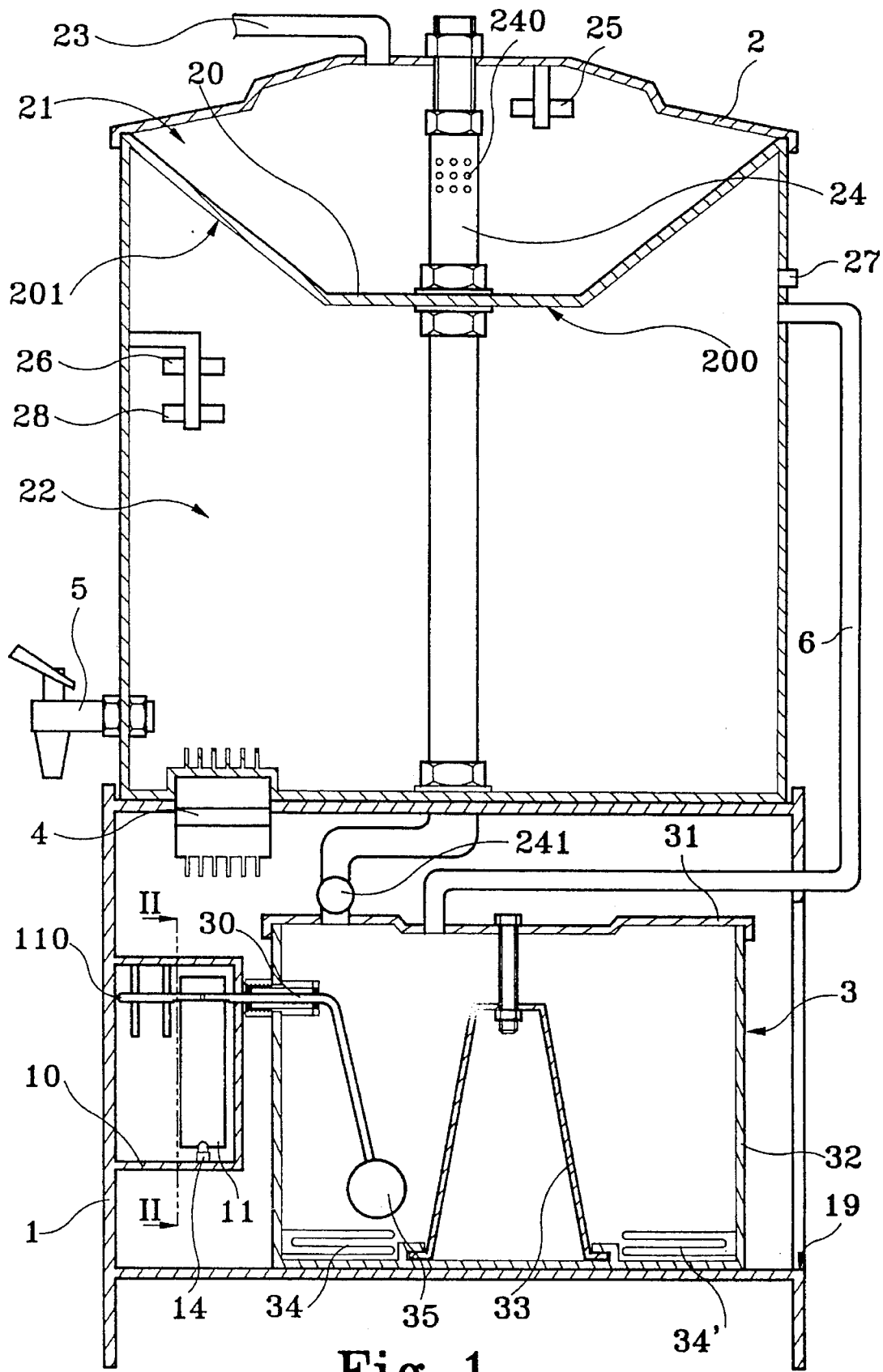
FIG. 1 is a plain view showing the internal structure of a distilled water supply device according to the present invention.

Referring to FIG. 1, a distilled water supply device in accordance with the present invention is generally comprised of a stand 1, a condensing unit 2 mounted on the stand 1 at the top, and a heating unit 3 suspended from the stand 1. The stand 1 has a side opening 19. Through the side opening 19, the heating unit 3 can be removed out of the stand 1 for a maintenance work.

The condensing unit 2 is a water-tight container 2 comprising an upper chamber 21 and a bottom chamber 22 separated by a partition wall 20. The partition wall 20 has a dripping end 200 at the lowest side, and a sloping condensing surface 201 extending upwards from the dripping end 200 to the periphery of the condensing unit 2. When steam is guided into the bottom chamber 22, it will be condensed into water at the sloping condensing surface 201, and condensed water will move along the sloping condensing surface 201 to the dripping end 200 and then drip from the dripping end 200 to the bottom of the bottom chamber 22. The upper chamber 21 comprises a water intake port 23 connected to an external water source, a guide pipe 24 fixed to the center of the partition wall 20 for guiding water to the heating unit 3 and having radial pores 240 at an elevation lower than that of the water intake port 23 for permitting water to flow from the upper chamber 21 to the heating unit 3 through the guide pipe 24, a safety switch 25 at the top side which automatically shuts off the water intake port 23 when the level of water in the upper chamber 21 surpasses a predetermined high level.

The bottom chamber 22 comprises an electronic semiconductor cooler 4 and a water tap 5 at the bottom for cooling condensed water and for output control of cold, condensed water respectively, a steam pipe 6 connected to the heating unit 3 for guiding steam from the heating unit 3 to the bottom chamber 22 for condensing into water. Because steam is condensed at the sloping condensing surface 201 of the partition wall 20, heat energy is transferred from steam to water in the upper chamber 21, therefore water in the upper chamber 21 is pre-heated when steam is condensed into water. A first water level control switch 26 and a second water level control switch 28 are mounted inside the bottom chamber 22 at different elevations. The first water level control switch 26 automatically cuts off power supply from the heating unit 3 when the level of water in the bottom chamber 22 surpasses a predetermined value. The second water level control switch 27 automatically turns on the heating unit 3 when the level of water in the bottom chamber 22 surpasses the predetermined value. A relief valve 27 is mounted on the bottom chamber 22 near the top. The relief valve 27 automatically releases pressure from the bottom chamber 22 when the inside pressure of the bottom chamber 22 surpasses a predetermined value. A whistle may be installed in the relief valve 27 to make a warning sound when the relief valve 27 is opened to release pressure.

The stand 1 comprises a control box 10 disposed at one side remote from the side opening 19. A swinging arm 11 is turned about a pivot 110 inside the control box 10. A link 30 is provided having a fixed end connected to the swinging arm 11 and a free end inserted into the heating unit 3. A float 35 is fixedly connected to the free end of the link 30 and suspending in the heating unit 3. When the level of water in the heating unit 3 is changed, the elevation of the float 35 is relatively changed, and therefore the link 30 is forced by the float 35 to change the angular position of the swinging arm 11. The heating unit 3 comprises a container 32 having a mounting frame 33 on the inside, a top cover 31 covered on the top side of the container 32 and secured to the mounting frame 33 by screw means, and electric heating elements 34 and 34' at the bottom side of the container 32. The top cover 31 has two holes (not shown) respectively connected to the guide pipe 24 and the steam pipe 6. A check valve 241 is installed in the guide pipe 24 to prohibit reverse flow of steam from the heating unit 3 to the upper chamber 21 of the condensing unit 2.

Figure 3:
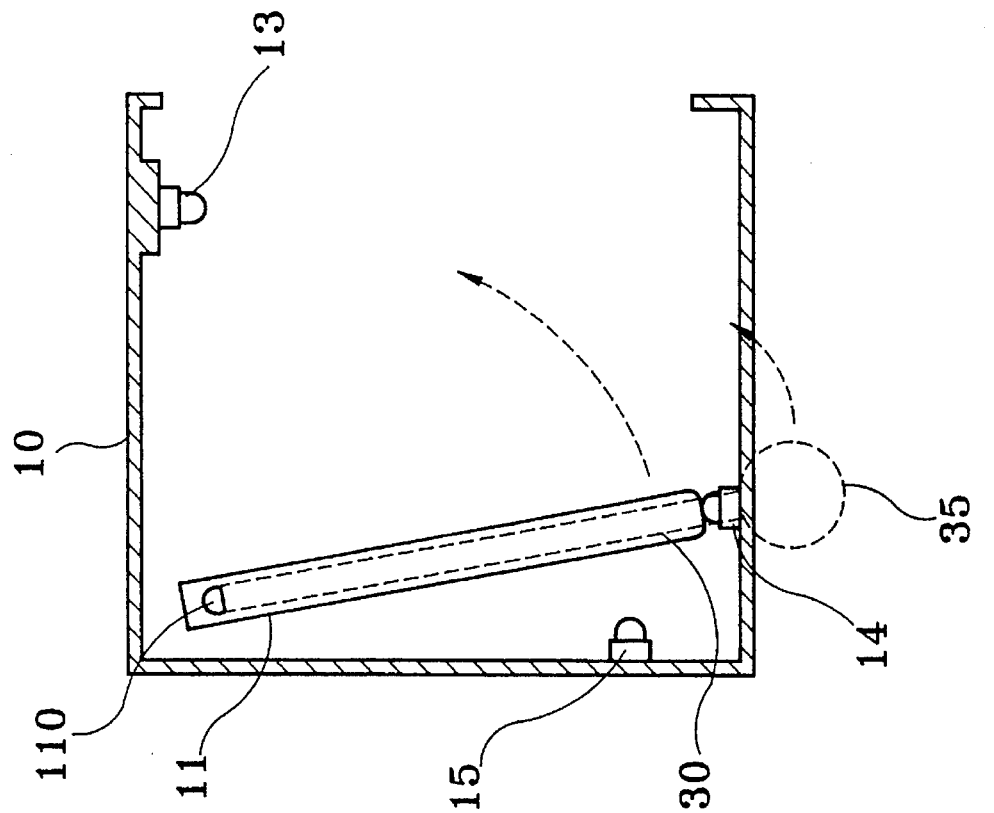
FIG. 3 is similar to FIG. 2 but showing the second microswitch triggered.
Figure 2:
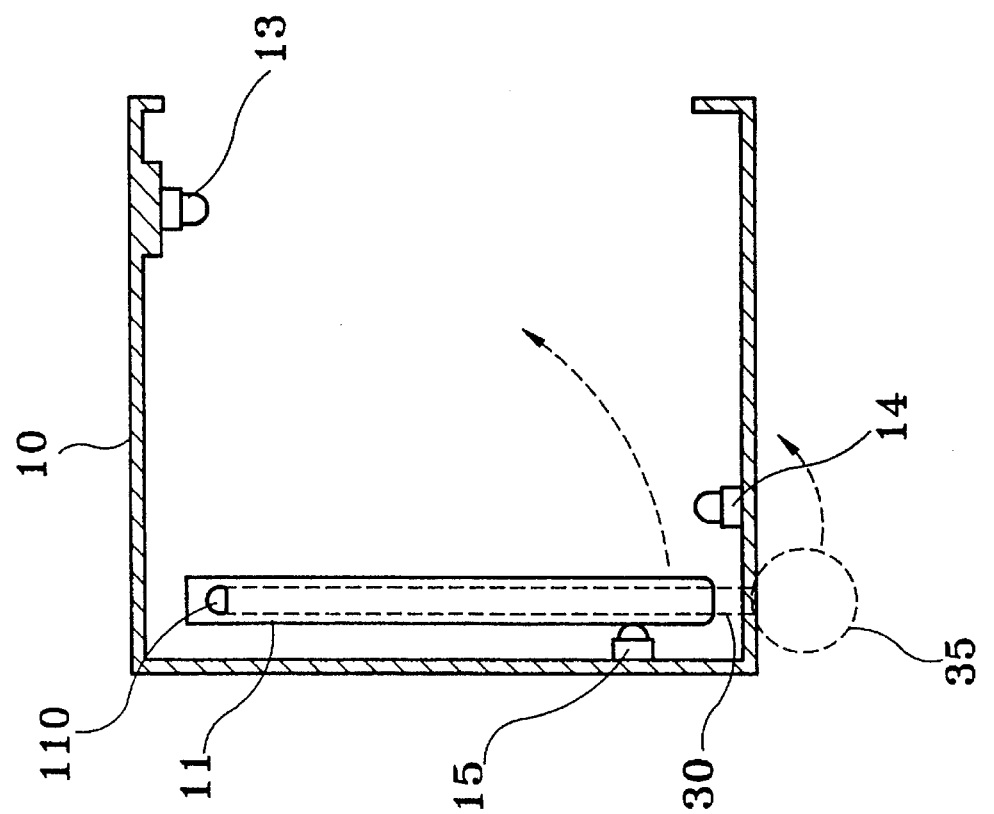
FIG. 2 is a sectional view along line II—II of FIG. 1, showing the third microswitch triggered.
Figure 5:
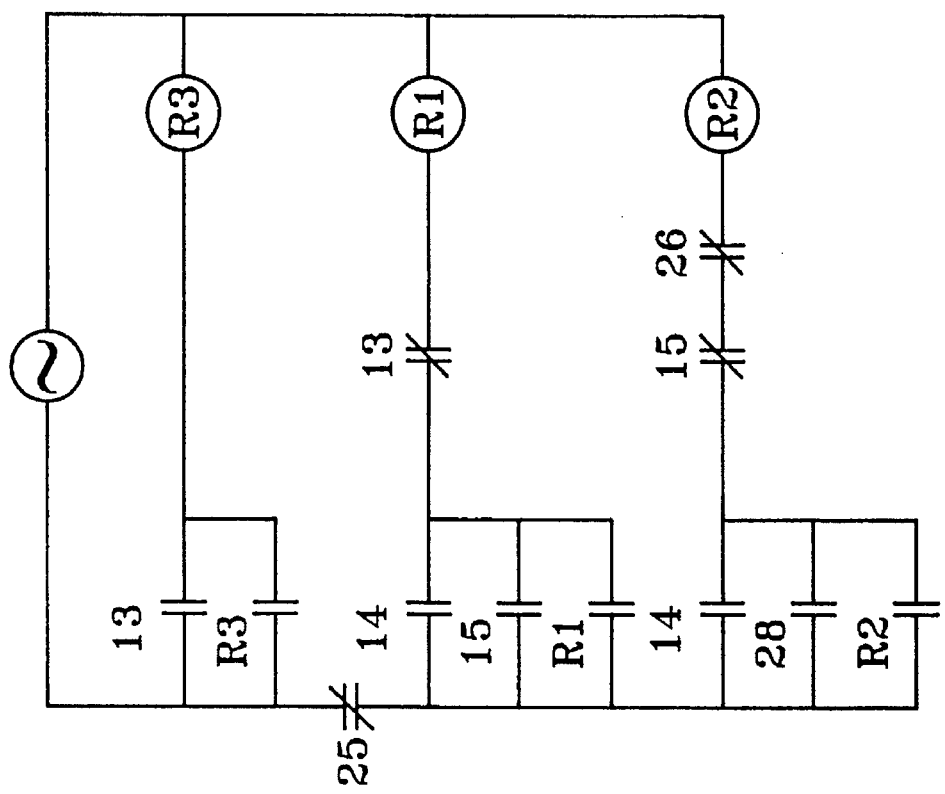
FIG. 5 is a circuit diagram according to the present invention.
Figure 4:
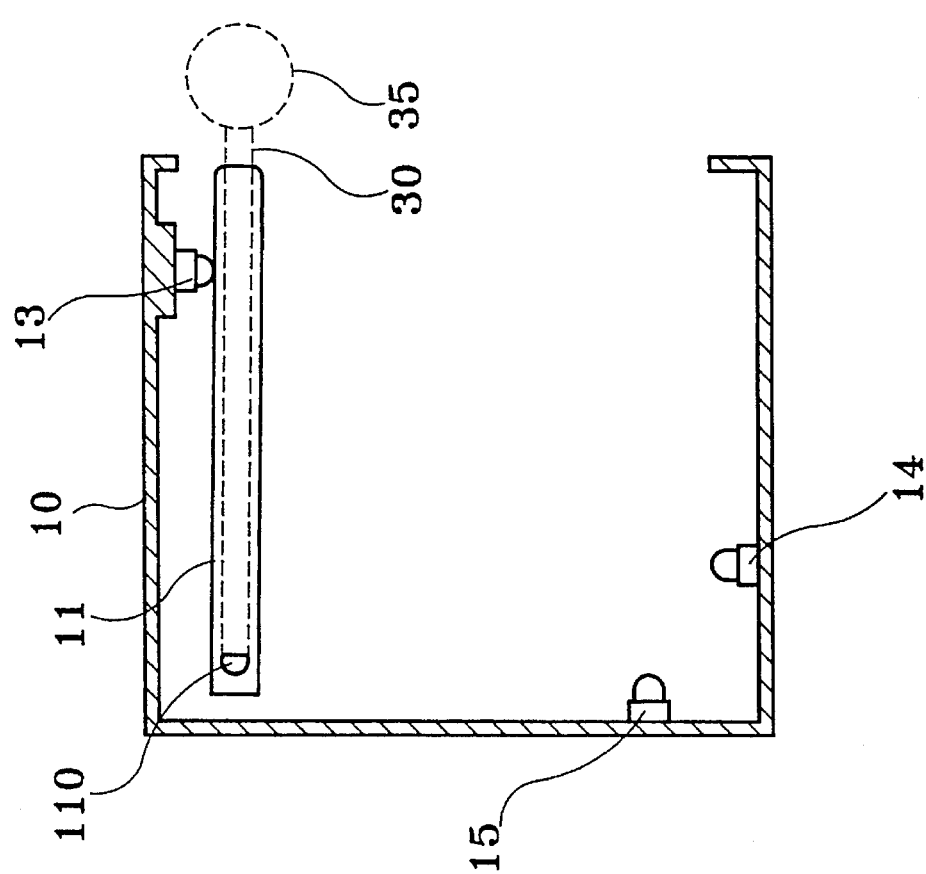
FIG. 4 is similar to FIG. 2 but showing the third microswitch triggered.

Referring to FIGS. 2, 3, and 4, the control box 10 comprises a first microswitch 13 for controlling the safety switch 25, a second microswitch 14 for controlling the first water level control switch 26, and a third microswitch 15 for controlling the second water level control switch 28. The first microswitch 13 is mounted inside the control box 10 at the top. The second microswitch 14 is mounted inside the control box 10 at the bottom. The third microswitch 15 is mounted inside the control box 10 adjacent to the second microswitch 14. When the swinging arm 11 is moved to the upper limit position, it will trigger the first microswitch 13. When the swinging arm 11 is moved to the lower limit position, it will trigger the second microswitch 14 and then the third microswitch 15. The circuit arrangement of these switch means is shown in FIG. 5, in which R1 is a water intake control relay for controlling the intake of water through the water intake port 23; R2 is heating control relay for controlling the operation of the electric heating elements 34 and 34'; R3 is a cooling control relay for controlling the operation of the electronic semiconductor cooler 4.

Figure 7:
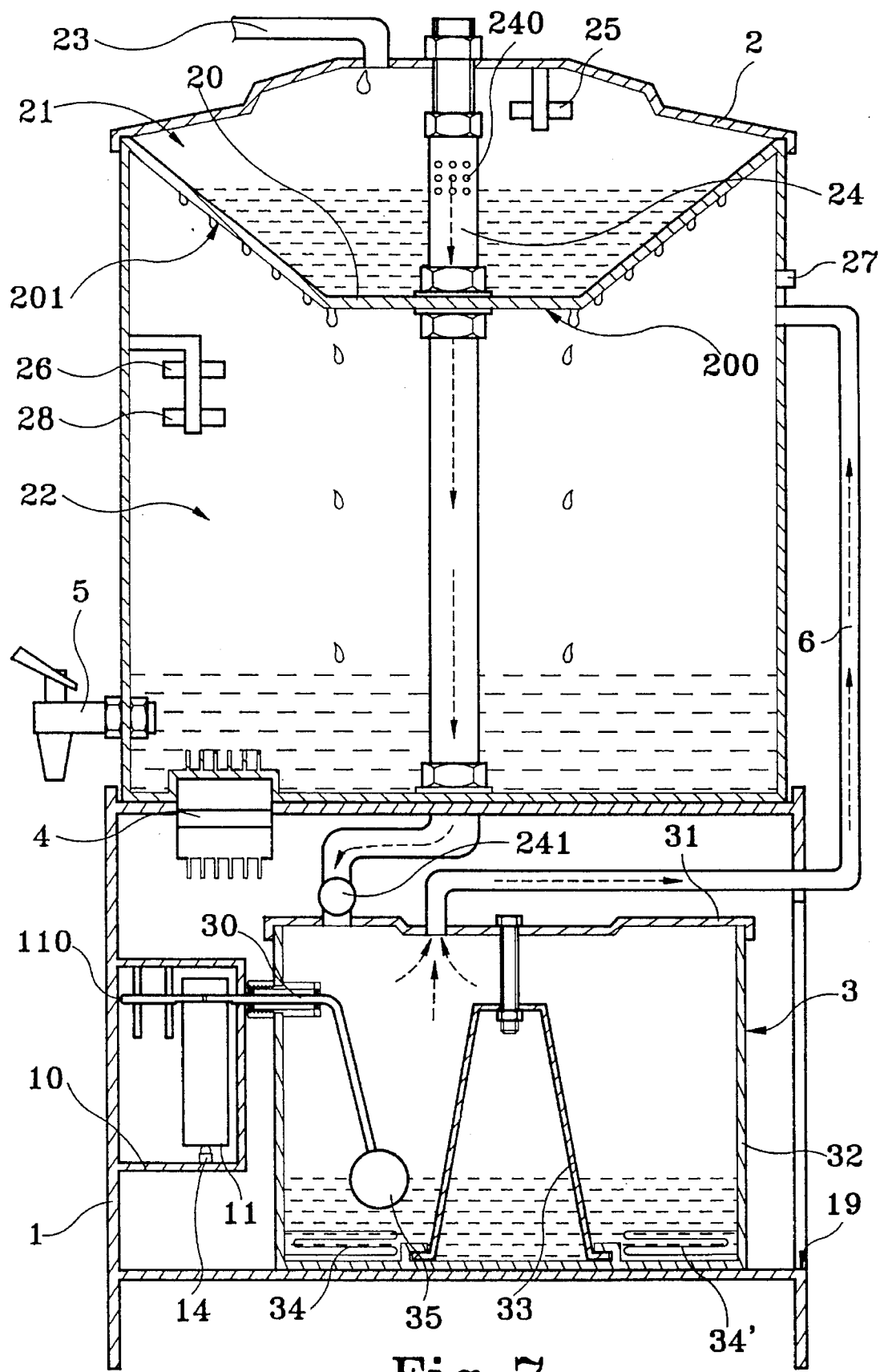
FIG. 7 is similar to FIG. 1 but showing water guided from the upper chamber of the condensing unit to the container of the heating unit and steam guided from the container of the heating unit to the bottom chamber of the condensing unit.
Figure 8:
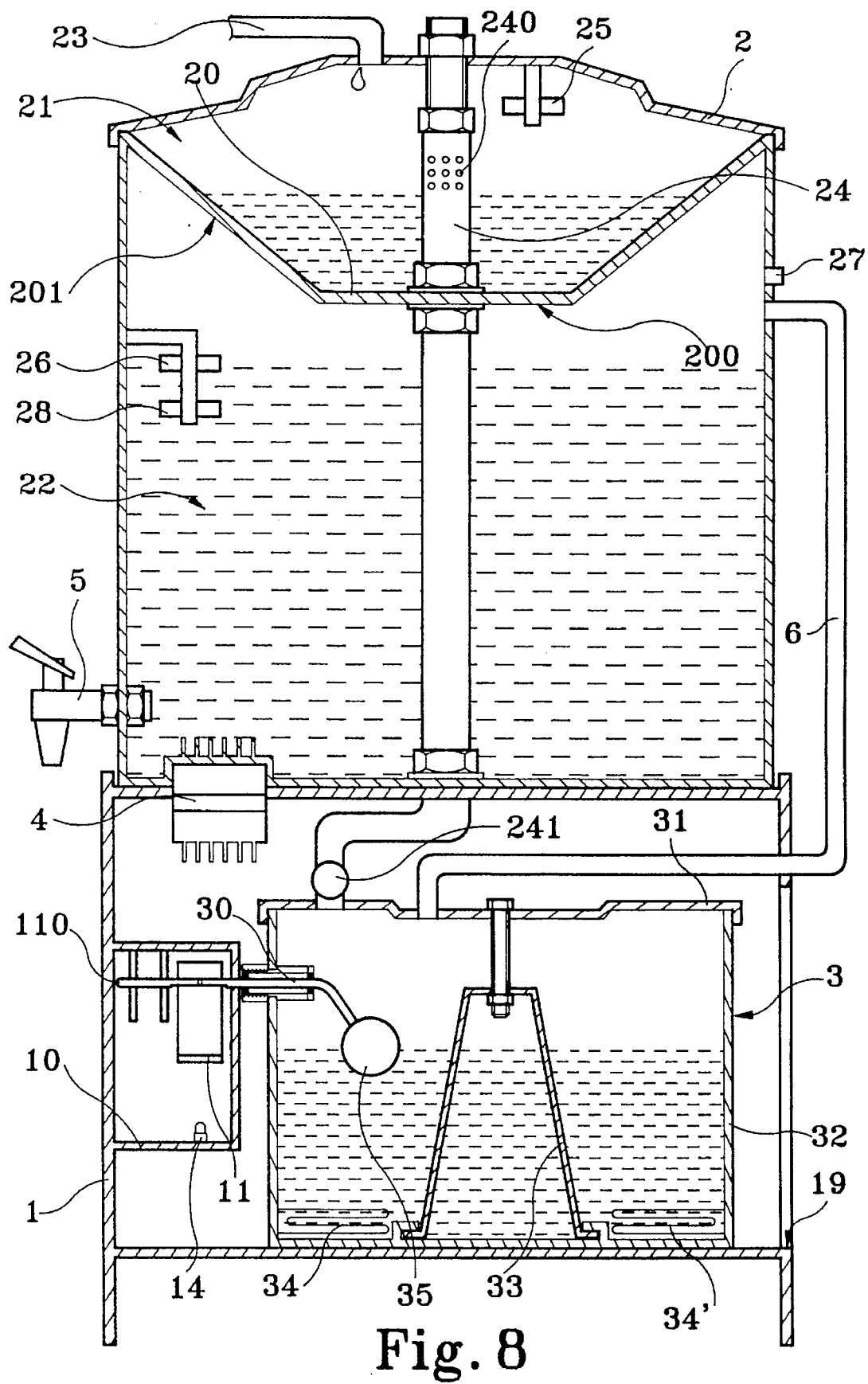
FIG. 8 is similar to FIG. 7 but showing the float moved to the upper limit position, the level of water in the bottom chamber of the condensing unit reached the upper limit position, and the electric heating elements turned off.

The operation of the present invention is outlined hereinafter. Referring to FIGS. 1 and 2, when there is no water in the container 32 of the heating unit 3, the float 35 is disposed at the lowest position (see FIG. 2), and the third microswitch 15 is depressed by swinging arm 11, therefore the electric heating elements 34 and 34' are off (relay R2 does no work), and water is guided into the upper chamber 21 of the condensing unit 2 through the water intake port 23 (R1 is energized because the first microswitch 13 is off). When water is continuously guided into the upper chamber 21 through the water intake port 23 and the level of water in the upper chamber 21 surpasses the pores 240, it immediately flows into the container 32 of the heating unit 3 through the guide pipe 24 to float the float 35. When the float 35 is moved upwards by water, the swinging arm 11 is synchronously turned upwards. When the swinging arm 11 touches the second microswitch 14, R2 is triggered, causing it to turn on the electric heating elements 34 and 34', and at the same time R1 keeps working, and water is continuously guided into the upper chamber 21 of the condensing unit 2 (see FIGS. 3 and 7). When the level of water in the container 32 of the heating unit 3 reaches the predetermined upper limit, the first microswitch 13 is triggered by the swinging arm 11, and R1 is off (see FIG. 4), and therefore intake water is stopped. At the same time, the electric heating elements 34 and 34' continuously heat water in the container 32 of the heating unit 3, permitting steam to flow through the steam pipe 6 to the bottom chamber 22 of the condensing unit 2 for condensing into distilled water. Because the first microswitch 13 is depressed, R3 is driven to turn on the electronic semiconductor cooler 4, causing it to cool down distilled water. When water in the container 32 of the heating unit 3 is continuously evaporated, the level of water in the container 32 of the heating unit 3 is gradually reduced. When the swinging arm 11 is lowered to the elevation of the second microswitch 14 as the level of water in the container 32 of the heating unit 3 is dropping, the second microswitch 14 will be triggered by the swinging arm 11. When the second microswitch 14 is triggered by the swinging arm 11 during its return stroke, R1 is turned on to let water be guided into the upper chamber 21 of the condensing unit 2 again. When the level of water in the bottom chamber 22 of the condensing unit 2 drops to the elevation of the first water level control switch 26, R2 is turned off, and therefore the electronic heating elements 34 and 34' are turned off (see FIG. 8). When the level of water in the bottom chamber 22 of the condensing unit 2 drops to the elevation of the second water level control switch 28 because of the consumption of users, the second water level control switch 28 is immediately triggered to turn on R2, and the distilling process is continued.

Figure 6:
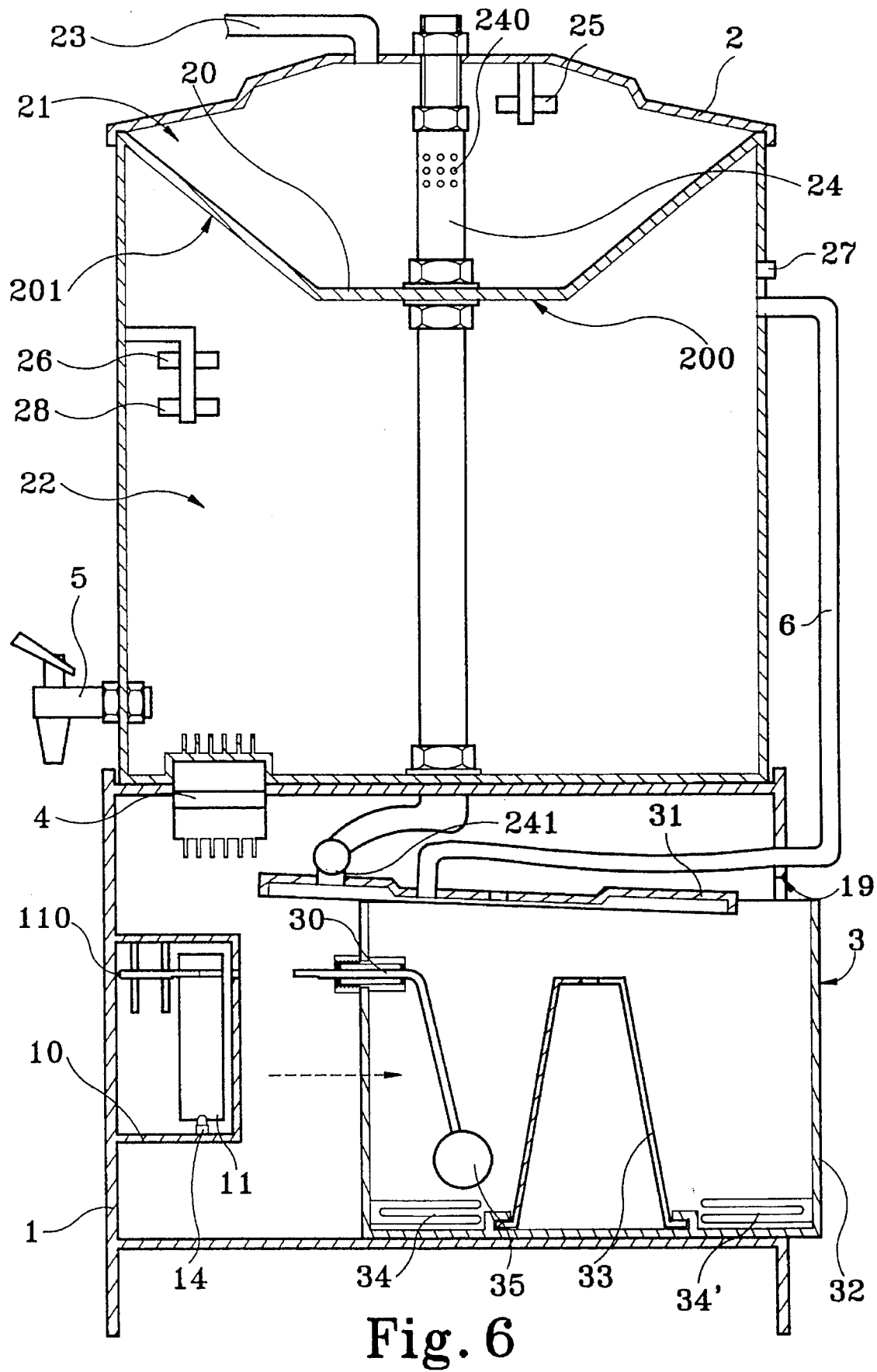
FIG. 6 shows the container of the heating unit disconnected to the top cover and partially moved out of the side opening of the stand.

Referring to FIG. 6, during a maintenance work, the container 32 can be disconnected from the top cover 31 and then taken out of the stand 1 through the side opening 19.

It is to be understood that the drawings are designed for purposes of illustration only, and are not intended as a definition of the limits and scope of the invention disclosed.

I claim:

1. A distilled water supply device comprising:
    a condensing unit for condensing steam into distilled water, said condensing unit comprising an upper chamber, a bottom chamber separated from said upper chamber, a water intake port for guiding water from an external water source into said upper chamber, a guide pipe for guiding water out of said upper chamber, said guide pipe having radial pores disposed inside said upper chamber at an elevation lower than that of said water intake port, a check valve installed in said guide pipe for prohibiting reverse flow of water, a safety switch for automatically shutting off said water intake port when the level of water in said upper chamber surpasses a predetermined value, an electronic semiconductor cooler mounted in said bottom chamber at a bottom side and controlled to cool down water in said bottom chamber, a relief valve for automatically releasing pressure from said bottom chamber when the pressure inside said bottom chamber surpasses a predetermined value, a water tap controlled to guide water out of said bottom chamber for drinking, a first water level control switch, which is triggered to cut off power supply when the level of water in said bottom chamber surpasses a predetermined high value, and a second water level control switch, which is triggered to turn on power supply when the level of water in said bottom chamber drops below a predetermined low value;

a stand for supporting said condensing unit, said stand comprising a pivot, a swinging arm turned about said pivot, a first microswitch controlled by said swinging arm to close said water intake port, a second microswitch controlled by said swinging arm to open said water intake port, and a third microswitch controlled by said swinging arm;

a heating unit mounted inside said stand for receiving water from said guide pipe and for heating water into steam, said heating unit comprises a float connected to said swinging arm by a link, and a plurality of electric heating elements controlled to heat water into steam, permitting steam to be guided to said bottom chamber of said condensing unit by a steam pipe for condensing into distilled water for drinking, said float being moved by water to move said swinging arm, causing it to alternatively trigger said first microswitch, said second microswitch, and said third microswitch, said electric heating elements being turned on when said second microswitch or said second water level control switch is triggered, said electric heating elements being turned off when said first water level control switch or said third microswitch is triggered.

2. The distilled water supply device of claim 1 wherein said condensing unit comprises a partition wall which separates said upper chamber from said bottom chamber, said partition wall comprising a dripping end at the lowest side, and a sloping condensing surface extending upwards from said dripping end to the periphery of said condensing unit.

3. The distilled water supply device of claim 1 wherein said relief valve is installed with a whistle.

4. The distilled water supply device of claim 1 wherein said heating unit is comprised of a container, and a top cover covered on said container and detachably connected to said container by screw means.

5. The distilled water supply device of claim 1 wherein said stand has a side opening through which said heating unit can be taken out of said stand.

\* \* \* \* \*